United States Patent
Whitmire

(10) Patent No.: US 10,094,504 B2
(45) Date of Patent: Oct. 9, 2018

(54) COUPLING FOR JOINING DUCTILE IRON AND PLASTIC PIPES

(71) Applicant: Mark Richard Whitmire, Chickamauga, GA (US)

(72) Inventor: Mark Richard Whitmire, Chickamauga, GA (US)

( * ) Notice: Subject to any disclaimer, the term of this patent is extended or adjusted under 35 U.S.C. 154(b) by 585 days.

(21) Appl. No.: 14/684,790

(22) Filed: Apr. 13, 2015

(65) Prior Publication Data
US 2015/0292657 A1    Oct. 15, 2015

Related U.S. Application Data

(60) Provisional application No. 61/979,890, filed on Apr. 15, 2014.

(51) Int. Cl.
| | |
|---|---|
| F16L 21/03 | (2006.01) |
| F16L 25/14 | (2006.01) |
| F16L 47/24 | (2006.01) |
| F16L 21/02 | (2006.01) |

(52) U.S. Cl.
CPC .............. *F16L 47/24* (2013.01); *F16L 21/022* (2013.01); *F16L 21/03* (2013.01); *F16L 25/14* (2013.01); *Y10T 29/49826* (2015.01)

(58) Field of Classification Search
CPC ......... F16B 2/00; F16B 7/0426; F16L 21/022; F16L 21/03; F16L 25/14; F16L 37/025; F16L 47/24; Y10T 403/31; Y10T 403/453
USPC .......... 74/18; 285/238, 369, 148.18, 148.23; 403/50, 223; 464/173
See application file for complete search history.

(56) References Cited

U.S. PATENT DOCUMENTS

| | | | | |
|---|---|---|---|---|
| 2,154,651 A | * | 4/1939 | Wodack ................. | B25D 17/08 279/19.6 |
| 2,380,690 A | * | 7/1945 | Graham ................ | E21B 17/042 285/114 |
| 2,776,151 A | * | 1/1957 | Harkenrider ............ | F16L 47/24 285/238 |
| 3,667,782 A | * | 6/1972 | Viazzi ..................... | F16L 17/04 285/110 |

(Continued)

OTHER PUBLICATIONS

"How to Connect Plastic Pipe to Cast Iron Pipe." Do It Yourself. Feb. 24, 2013, [online], [retrieved on Apr. 25, 2018] Retrieved from the Internet <URL: https://web.archive.org/web/20130224050813/https://www.doityourself.com/stry/how-to-connect-plastic-pipe-to-cast-iron-pipe>.*

*Primary Examiner* — Josh Skroupa
(74) *Attorney, Agent, or Firm* — Chambliss, Bahner & Stophel, P.C.

(57) ABSTRACT

A coupling for use in joining together a ductile iron pipe and a plastic pipe includes a ductile portion, a plastic portion and a transition portion that has a frustoconical transition inside surface. The ductile portion has a first end that is adapted to accept the ductile iron pipe, an annular groove adjacent to the first end that is adapted to receive a sealing gasket, and a ductile engagement portion having an inside diameter that is sized so as to form a friction fit with the outside diameter of the ductile iron pipe. The plastic portion has a second end that is adapted to accept the plastic pipe, an annular groove adjacent to the second end that is adapted to receive a sealing gasket, and a plastic engagement portion having an inside diameter that is sized so as to form a friction fit with the outside diameter of the plastic pipe.

16 Claims, 6 Drawing Sheets

(56) References Cited

U.S. PATENT DOCUMENTS

| | | | | |
|---|---|---|---|---|
| 3,784,239 A * | 1/1974 | Carter | ................... | B29C 33/52 285/294.2 |
| 4,018,461 A * | 4/1977 | Bram | ................... | F16J 15/32 277/604 |
| 4,242,164 A * | 12/1980 | Skinner | ................... | F16L 41/088 156/304.1 |
| 4,460,183 A * | 7/1984 | Brissette | ................... | F16C 3/03 277/572 |
| 4,478,437 A * | 10/1984 | Skinner | ................... | F16L 5/10 24/20 EE |
| 4,711,474 A * | 12/1987 | Patrick | ................... | F16L 15/003 277/616 |
| 4,969,671 A * | 11/1990 | Gross | ................... | E21B 17/042 285/333 |
| 5,029,907 A * | 7/1991 | Gundy | ................... | E03F 3/04 16/225 |
| 5,263,748 A * | 11/1993 | Carstensen | ................... | E21B 17/042 285/333 |
| 5,350,202 A * | 9/1994 | Fritz | ................... | F16L 47/16 264/271.1 |
| 5,505,500 A * | 4/1996 | Webb | ................... | E03F 5/08 137/375 |
| 5,911,447 A * | 6/1999 | Ball | ................... | F16L 25/14 285/105 |
| 6,547,159 B1 * | 4/2003 | Westby | ................... | B05B 15/60 239/204 |
| 6,548,760 B1 * | 4/2003 | Stout, Jr. | ................... | F16L 25/14 138/177 |
| 7,575,519 B2 * | 8/2009 | Dice | ................... | F16D 3/845 464/173 |
| 7,767,908 B2 * | 8/2010 | Sylvan | ................... | F16L 5/10 174/72 A |
| 8,631,830 B2 * | 1/2014 | Gosis | ................... | F16L 47/265 138/104 |
| 9,915,381 B2 * | 3/2018 | Doole | ................... | F16L 9/12 |
| 2006/0017280 A1 * | 1/2006 | Ball | ................... | F16L 17/10 285/15 |

\* cited by examiner

COUPLING FOR JOINING DUCTILE IRON AND PLASTIC PIPES

CROSS-REFERENCE TO RELATED APPLICATION

This application claims the benefit of U.S. Provisional Patent Application No. 61/979,890, which was filed on Apr. 15, 2014.

FIELD OF THE INVENTION

The invention comprises a coupling for joining pipes of different materials, such as those used in municipal water pipelines and waste pipes, and a method for using such a coupling. More particularly, the invention comprises a "knock-on" coupling for joining ductile iron and plastic pipes, and a method for installing such a coupling.

BACKGROUND OF THE INVENTION

For conveying fluids under pressure, pipes are the backbone of any wastewater or water line system. Ductile iron pipe has been the industry standard for modern water and wastewater systems for nearly sixty years. Ductile iron pipe is available in various diameters from 2 inches up to 12 inches, and in lengths of 18 feet and 20 feet. Ductile iron pipe has been proven over the years to be strong, durable, and reliable.

Plastic pipes and more specifically, polyvinyl chloride (PVC) pipes were first introduced into the United States in the 1950s. However, due to health concerns and primitive manufacturing techniques, plastic pipe did not become a standard in the modern water and wastewater systems until the early 1980s. Plastic pipe continues to be an area of innovation for water and sewer pipes and its percentage of the total water pipe used in the United States grows each year. As cast iron and ductile iron water pipes age and develop leaks, they are commonly replaced with plastic pipes. Furthermore, the installation of plastic water pipes for new construction is becoming more common.

According to a recent study by the Environmental Protection Agency, there are currently over 1,000,000 miles of water mains in the United States. Ductile iron pipe represents about 24% of the pipe used in the United States to carry water and wastewater, while PVC pipe represents about 17%. Currently over 13,200 miles of water pipe are installed in the United States each year with approximately 48% of the newly installed pipe being ductile iron pipe and approximately 38% being PVC pipe. In addition to PVC, other types of plastics are used and are gaining acceptance in this field, including polyethylene, chlorinated polyvinyl chloride (CPVC), acrylonitrile butadiene styrene (ABS) and other polyolefins.

The conventional method of joining plastic pipes to ductile iron pipes is a time-consuming and labor-intensive process wherein a coupler is placed between a ductile iron pipe and a plastic pipe and a plurality of retaining bolts are used to lock the coupler in place, creating a transition between the ductile iron and plastic pipes. The ends of each pipe must be inserted into the coupling and then the plurality of retaining bolts must be tightened either by hand or with the aid of a tool or other mechanical device, all of which requires a significant amount of time and labor. Frequently, water pipes are installed in ditches that may be only 18 inches wide, and this increases the difficulty in installing pipe joints on long pipe runs.

It would be advantageous if a method and apparatus for connecting plastic pipe to ductile iron pipe without a complex coupler could be developed.

Advantages of the Invention

This invention provides substantial benefits over the current methods of joining pipes of dissimilar materials by dramatically reducing the time, labor, and materials needed. More specifically, this invention allows ductile iron pipe to be connected to plastic pipe through the use of a slip-on or "knock-on" coupling. This coupling slips onto both the ductile iron pipe and the plastic pipe and does not require any retaining bolts. Other advantages and features of this invention will become apparent from an examination of the drawings and the ensuing description.

NOTES ON CONSTRUCTION

The use of the terms "a", "an", "the" and similar terms in the context of describing the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic.

The use of any and all examples or exemplary language (e.g., "such as" and "preferably") herein is intended merely to better illuminate the invention and the preferred embodiment thereof, and not to place a limitation on the scope of the invention. Nothing in the specification should be construed as indicating any element as essential to the practice of the invention unless so stated with specificity.

Various terms are specifically defined herein. These terms are to be given their broadest possible construction consistent with such definitions, as follows:

The term "ductile iron pipe" refers to a pipe made of ductile iron that is commonly used for potable water and wastewater transmission and distribution.

The term "plastic" refers to a material consisting of any of a wide range of synthetic or semi-synthetic organic compounds that are malleable and can be molded into solid objects. Plastic materials are typically organic polymers of high molecular weight, but they often contain other substances. They are usually synthetic, and most commonly are derived from petrochemicals.

The term "inserting", as used to describe the placement of a coupling onto an end of a pipe, means either that the end of the pipe is placed into the coupling or that the coupling is placed over the end of the pipe.

The term "lubricant" refers to soap, a mixture of soap and water, and any other material that is adapted to reduce friction between a pipe and an inner surface of a pipe coupling.

The term "pushing", as used to describe the relative motion of a coupling and a pipe, means either that the pipe is pushed into the coupling or that the coupling is pushed onto the pipe.

SUMMARY OF THE INVENTION

The invention comprises a coupling for use in joining together a ductile iron pipe having a ductile iron pipe outside diameter and a plastic pipe having a plastic pipe outside diameter. The coupling includes a ductile portion, a plastic portion and a transition portion between the plastic portion and the ductile portion, which transition portion has a frustoconical transition inside surface. The ductile portion has a first end that is adapted to accept the ductile iron pipe and an annular groove adjacent to the first end that is adapted to receive a sealing gasket. The ductile portion also has a ductile engagement portion (also referred to herein as a first engagement portion) with an inside diameter that is sized so as to form a friction fit with the outside diameter of the ductile iron pipe. The plastic portion has a second end that is adapted to accept the plastic pipe and an annular groove adjacent to the second end that is adapted to receive a sealing gasket. The plastic portion also has a plastic engagement portion (also referred to herein as a second engagement portion) with an inside diameter that is sized so as to form a friction fit with the outside diameter of the plastic pipe.

In order to facilitate an understanding of the invention, the preferred embodiments of the invention are illustrated in the drawings, and a detailed description thereof follows. It is not intended, however, that the invention be limited to the particular embodiments described or to use in connection with the pipes illustrated herein. Various modifications and alternative embodiments such as would ordinarily occur to one skilled in the art to which the invention relates are also contemplated and included within the scope of the invention described and claimed herein.

BRIEF DESCRIPTION OF THE DRAWINGS

The presently preferred embodiment of the invention is illustrated in the accompanying drawings, in which.

DESCRIPTION OF THE PREFERRED EMBODIMENTS OF THE INVENTION

Figure 1:
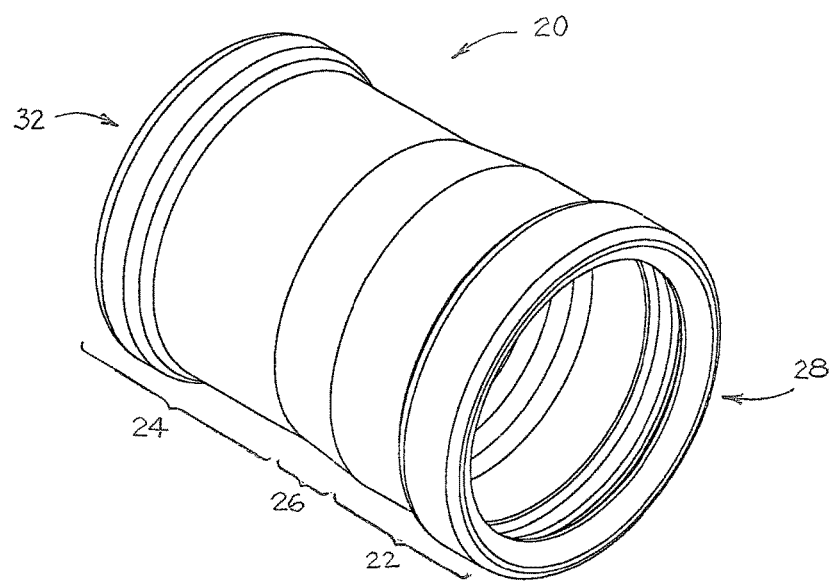
FIG. 1 is a perspective view of a first embodiment of the invention.

Referring now to FIGS. 1-4, a first embodiment of the invention comprises ductile iron and plastic pipe coupling 20 having ductile portion 22, plastic portion 24 and transition portion 26 between the ductile portion and the plastic portion. The invention contemplates a coupling with two or more open ends that are adapted to receive pipes to be joined together. Coupling 20 includes first end 28 on ductile portion 22 that is adapted to accept a ductile iron pipe 30 (shown in FIG. 2), and second end 32 on plastic portion 24 that is adapted to accept a plastic pipe 34 (also shown in FIG. 2). Coupling 20 is adapted for connecting ductile iron pipe 30, having inside diameter $D_{DI}$ and outside diameter $D_{DO}$), and plastic pipe 34, having inside diameter $D_{PI}$ and outside diameter $D_{PO}$. In some embodiments of the invention, the inside diameter of the ductile iron pipe and the inside diameter of the plastic pipe may be the same, and in other embodiments of the invention, they may be different. In the latter circumstance (shown in FIGS. 9-12), the transition portion of the coupling may comprise a reducer section that serves to bridge the difference between the inside diameter of the ductile iron pipe and the inside diameter of the plastic pipe. Preferably, the length of the coupling is between one and six times the smaller of the inside diameter of the pipes to be joined.

Referring again to FIGS. 1-4B, ductile portion 22 includes annular groove 35 adjacent to first end 28, which groove is adapted to receive a conventional sealing gasket. Preferably, annular groove 35 includes central bead 36 (best shown in FIG. 4A) which permits the annular groove to receive a gasket 37 (shown in FIG. 4B) such as a TYTON® gasket (made and sold by U.S. Pipe And Foundry Company) that is itself provided with an annular groove in its outer periphery. Ductile portion 22 also has a ductile engagement portion 38 with an inside diameter $D_{DE}$ that is sized so as to form a friction fit with outside diameter $D_{DO}$ of ductile iron pipe 30. Furthermore, it is preferred that the length of ductile portion 22 must be at least about 30% of the length of coupling 20.

Figure 4A:
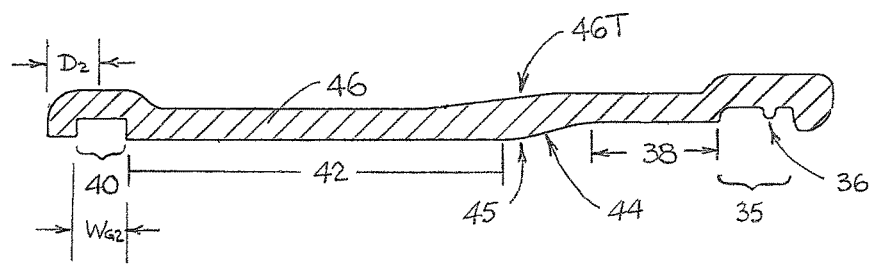
FIG. 4A is a detailed view of the cross-sectional profile of the embodiment of the invention shown in FIGS. 1-3.
Figure 4B:
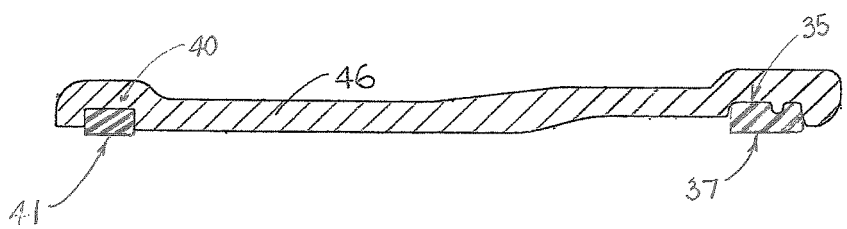
FIG. 4B is a view of the cross-sectional profile of the embodiment of the invention shown in FIGS. 1-4A, showing the location and placement of the elastomeric sealing gaskets.
Figure 2:
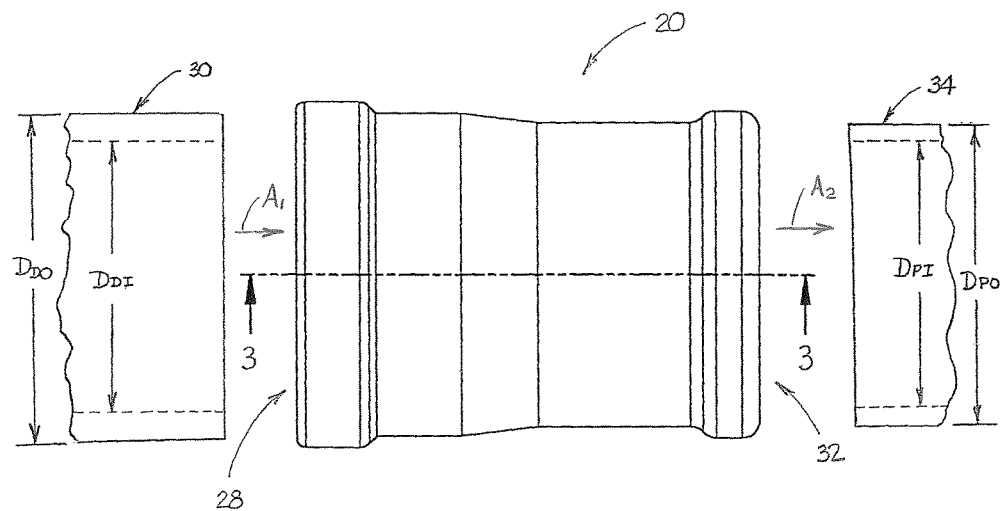
FIG. 2 is a side view of the embodiment of the invention shown in FIG. 1, illustrating how it may be used to join a ductile iron pipe and a plastic pipe.
Figure 3:
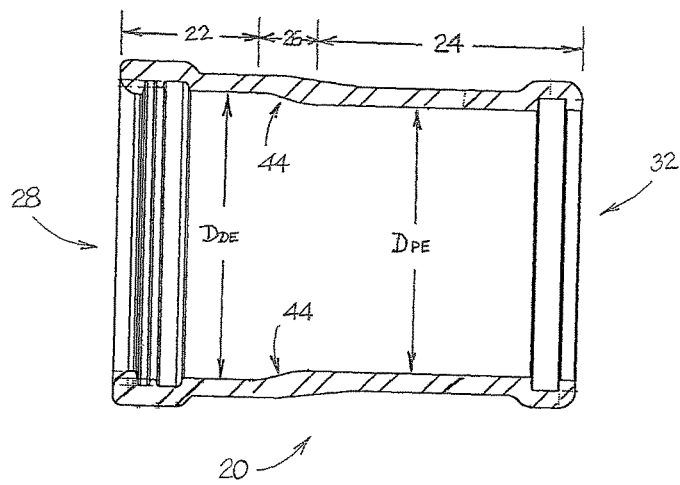
FIG. 3 is a sectional view of the embodiment of FIG. 2, taken along the line 3-3 of FIG. 2.
Figure 5:
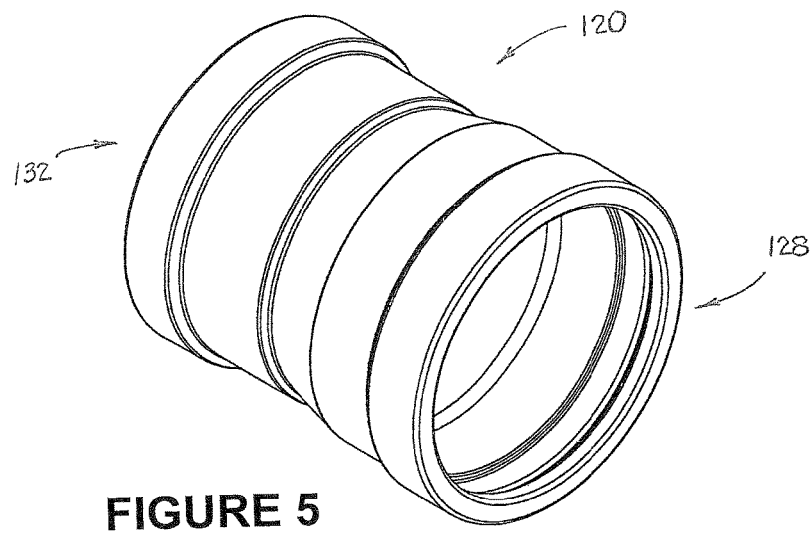
FIG. 5 is a perspective view of a second embodiment of the invention.
Figure 8A:
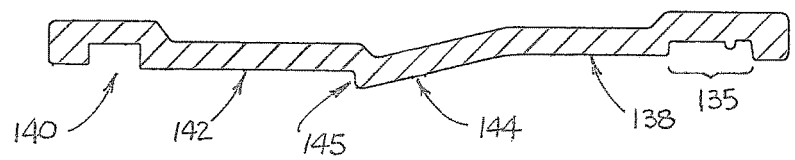
FIG. 8A is a detailed view of the cross-sectional profile of the embodiment of the invention shown in FIGS. 5-7.
Figure 8B:
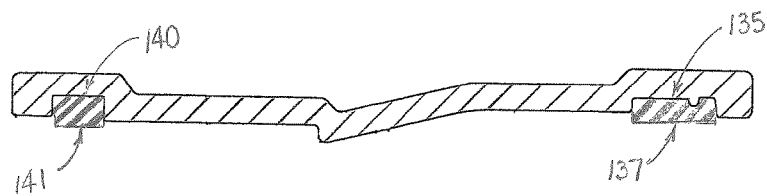
FIG. 8B is a view of the cross-sectional profile of the embodiment of the invention shown in FIGS. 5-8A, showing the location and placement of the elastomeric sealing gaskets.
Figure 6:
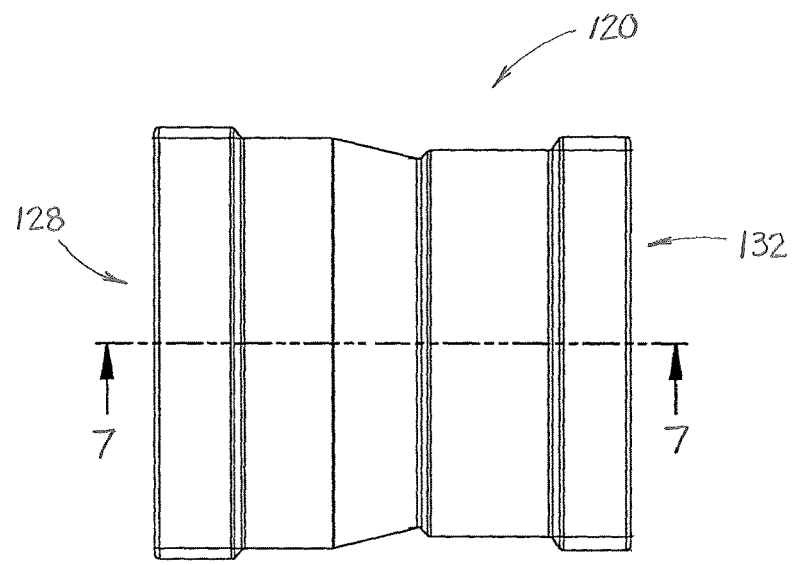
FIG. 6 is a side view of the embodiment of the invention shown in FIG. 5.
Figure 7:
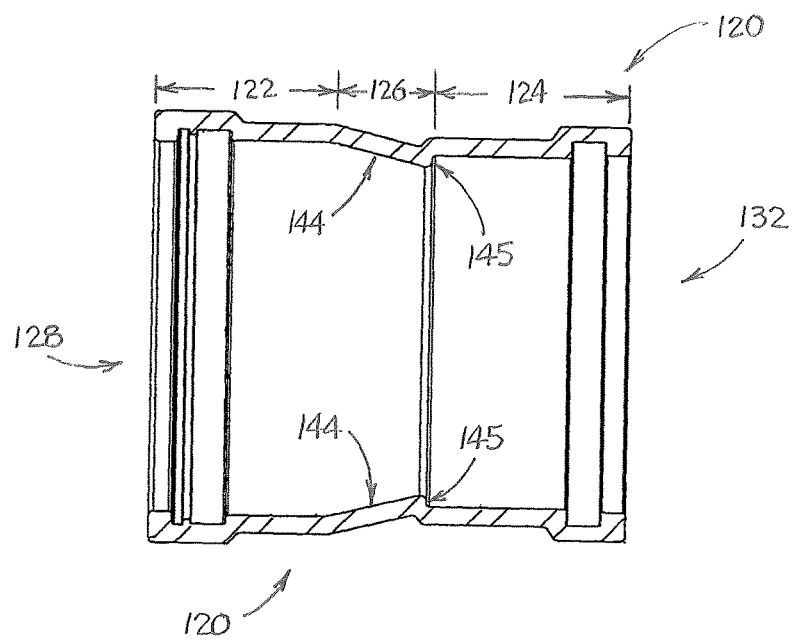
FIG. 7 is a sectional view of the embodiment of FIG. 6, taken along the line 7-7 of FIG. 6.
Figure 9:
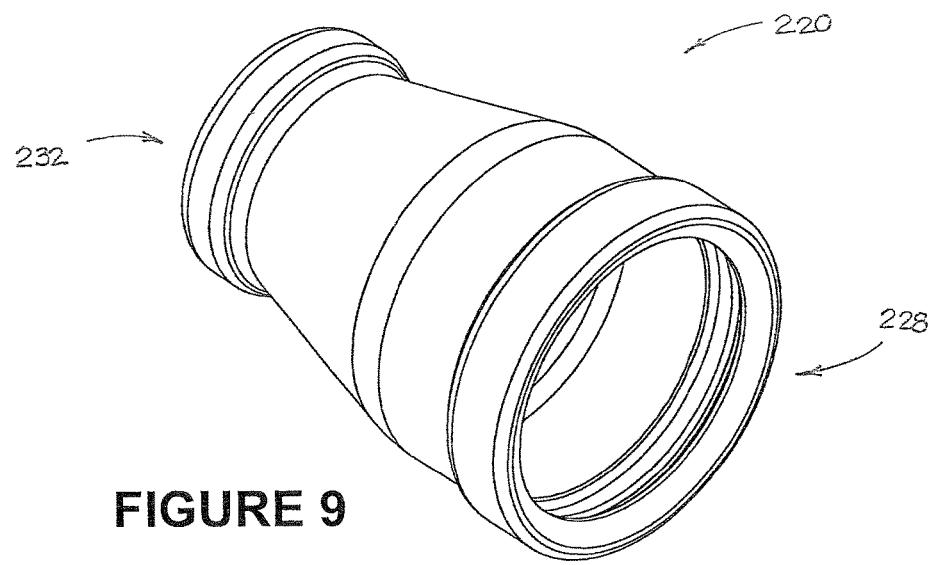
FIG. 9 is a perspective view of a third embodiment of the invention.
Figure 12A:
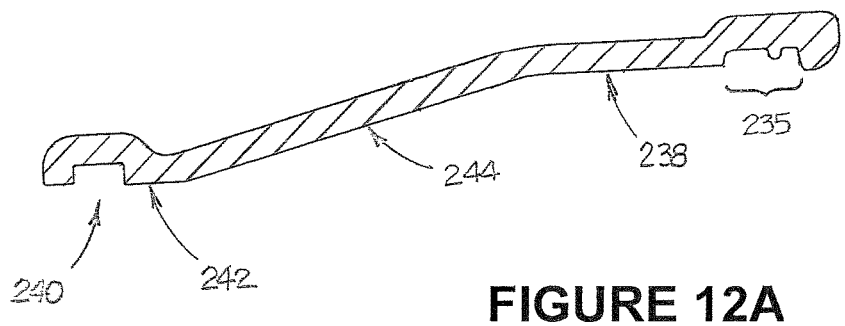
FIG. 12A is a detailed view of the cross-sectional profile of the embodiment of the invention shown in FIGS. 9-11.
Figure 12B:
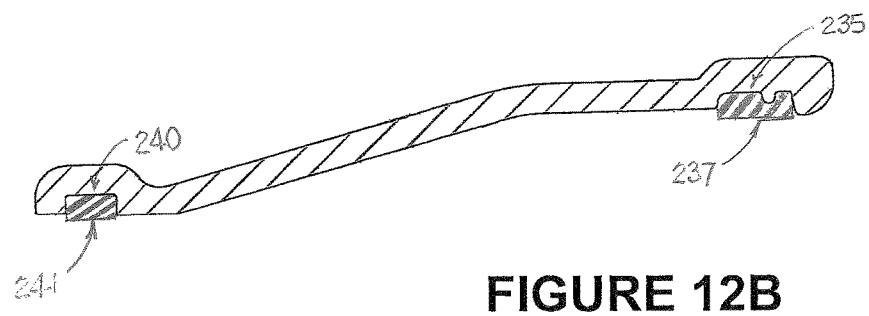
FIG. 12B is a view of the cross-sectional profile of the embodiment of the invention shown in FIGS. 9-12A, showing the location and placement of the elastomeric sealing gaskets.
Figure 10:
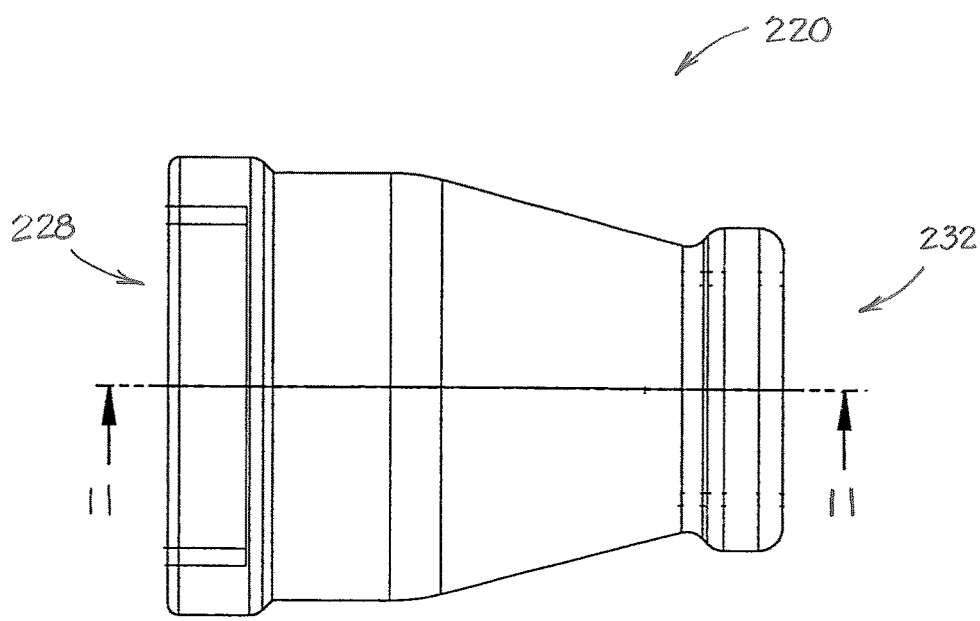
FIG. 10 is a side view of the embodiment of the invention shown in FIG. 9.
Figure 11:
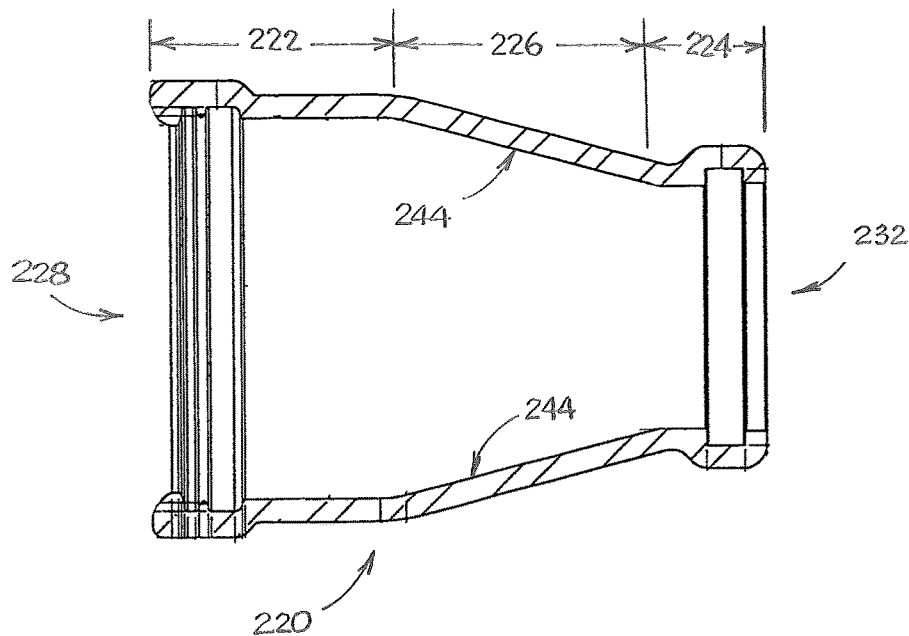
FIG. 11 is a sectional view of the embodiment of FIG. 10, taken along the line 11-11 of FIG. 10.

Plastic portion 24 includes annular groove 40 adjacent to second end 32, which groove is adapted to receive a conventional sealing gasket 41 (shown in FIG. 4B). Preferably, the width $W_{G2}$ of annular groove 40 (shown in FIG. 4) is approximately equal to the distance $D_2$ from the second end of coupling 20 to the center of the annular groove. Plastic portion 24 also has a plastic engagement portion 42 with an inside diameter $D_{PE}$ that is sized so as to form a friction fit with outside diameter $D_{PO}$ of plastic pipe 34. Furthermore, it is preferred that the length of plastic portion 24 must be at least about 30% of the length of coupling 20.

Transition portion 26 between ductile portion 22 and plastic portion 26 has a frustoconical transition inside surface 44. As best shown in FIG. 4A, frustoconical transition inside surface 44 terminates in a curved surface 45 at the inside surface of plastic engagement portion 42. Preferably, coupling 20 has a sidewall 46 of varying thickness along its length, and the thickest portion 46T of the sidewall is in transition portion 26, as best shown in FIG. 4A.

Coupling 20 is used to join plastic pipe 34 and ductile iron pipe 30 by first placing a pair of conventional gaskets in annular grooves 35 and 40. Preferably, an elastomeric gasket 37 having an inside diameter that is less than the outside diameter of the ductile iron pipe is placed into annular groove 35 adjacent first end 28 of the coupling, and an elastomeric gasket 41 having an inside diameter that is less than the outside diameter of the plastic pipe is placed in annular groove 40 adjacent second end 32 of the coupling. Then, the coupling is pushed onto the end of the plastic pipe as indicated by arrow $A_2$ in FIG. 2 until the end of the plastic pipe extends past transition portion 26. Preferably, the coupling is pushed onto the end of the plastic pipe until the end of the plastic pipe extends into ductile portion 22 of the coupling. Then, a lubricant may be applied to the end of ductile iron pipe, and this end is then inserted into first end 28 of the coupling as indicated by arrow $A_1$ in FIG. 2. The end of the ductile iron pipe is pushed into ductile engagement portion 38, and is preferably pushed into contact with the end of the plastic pipe within the coupling.

A second embodiment of the invention is illustrated in FIGS. 5-8B. As shown therein, ductile iron and plastic pipe coupling 120 has ductile portion 122, plastic portion 124 and transition portion 126 between the ductile portion and the plastic portion. Coupling 120 includes first end 128 on ductile portion 122 that is adapted to accept a ductile iron pipe (not shown, but similar to ductile iron pipe 30 shown in FIG. 2), and second end 132 on plastic portion 124 that is adapted to accept a plastic pipe (also not shown, but similar to plastic pipe 34 shown in FIG. 2). Ductile portion 122 includes annular groove 135 adjacent first end 128, which groove is adapted to receive a conventional sealing gasket 137 (shown in FIG. 8B). Ductile portion 122 also has a ductile engagement portion 138 with an inside diameter that is sized so as to form a friction fit with the outside diameter of the ductile iron pipe. Furthermore, the length of ductile portion 122 is preferably at least about 30% of the length of coupling 120. Plastic portion 124 includes annular groove 140 adjacent to second end 132, which groove is adapted to receive a conventional sealing gasket 141 (shown in FIG. 8B). Plastic portion 124 also has a plastic engagement portion 142 with an inside diameter that is sized so as to form a friction fit with the outside diameter of the plastic pipe. Furthermore, the length of plastic portion 124 is preferably at least about 30% of the length of coupling 120. Coupling 120 differs from coupling 20 in that the frustoconical transition inside surface 144 terminates at the inside surface of the plastic engagement portion 142 in a ledge surface 145 that is generally perpendicular to the inside surface of the plastic engagement portion. Ledge surface 145 provides an abutment surface for the end of the plastic pipe.

A third embodiment of the invention is illustrated in FIGS. 9-12B. This embodiment is adapted to join a ductile iron pipe having an inside diameter that is much larger than the inside diameter of the plastic pipe to be joined. As shown in FIGS. 9-12B, ductile iron and plastic pipe coupling 220 has ductile portion 222, plastic portion 224 and transition portion 226 (which also serves as a reducer section) between the ductile portion and the plastic portion. Coupling 220 includes first end 228 on ductile portion 222 that is adapted to accept a ductile iron pipe (not shown, but similar to ductile iron pipe 30 shown in FIG. 2), and second end 232 on plastic portion 224 that is adapted to accept a plastic pipe (also not shown, but similar to plastic pipe 34 shown in FIG. 2). Ductile portion 222 includes annular groove 235 adjacent to first end 228, which groove is adapted to receive a conventional sealing gasket 237 (shown in FIG. 12B). Ductile portion 222 also has a ductile engagement portion 238 with an inside diameter that is sized so as to form a friction fit with the outside diameter of the ductile iron pipe. Plastic portion 224 includes annular groove 240 adjacent to second end 232, which groove is adapted to receive a conventional sealing gasket 241 (shown in FIG. 12B). Plastic portion 224 also has a plastic engagement portion 242 with an inside diameter that is sized so as to form a friction fit with the outside diameter of the plastic pipe. Coupling 220 also has a transition portion 226 which has a frustoconical transition inside surface 244.

The coupling may be formed in such ways as to accept various classes and schedules of plastic pipe and ductile iron pipe. The coupling can be manufactured in different sizes to interface with various sizes of commercially available ductile iron pipe and plastic pipe. The coupling is preferably made from ductile iron, although it may also be made of other rigid materials having sufficient strength to withstand the pressures encountered in the particular application.

Although this description contains many specifics, these should not be construed as limiting the scope of the invention, but as merely providing illustrations of the presently preferred embodiments thereof, as well as the best modes contemplated by the inventor of carrying out the invention. The invention, as described herein, is susceptible to various modifications and adaptations, as would be understood by those having ordinary skill in the art to which the invention relates.

What is claimed is:

1. A coupling for use in joining together a ductile iron pipe having a ductile iron pipe outside diameter and a plastic pipe having a plastic pipe outside diameter, said coupling being comprised of rigid material and further comprising:
   (a) a first end that is adapted to accept the ductile iron pipe;
   (b) a first elastomeric gasket having an inside diameter that is configured to be less than the ductile iron pipe outside diameter, said first elastomeric gasket including an annular groove in its outer periphery;
   (c) an annular groove on the inside surface of the coupling adjacent to the first end, said annular groove including a central bead so that the annular groove may receive the first elastomeric gasket;
   (d) a first engagement portion having an inside diameter that is sized so as to form a friction fit with the outside diameter of the ductile iron pipe;
   (e) a second end that is adapted to accept the plastic pipe;
   a second engagement portion having an inside diameter that is sized so as to form a friction fit with the outside diameter of the plastic pipe;
   (g) a transition portion between the first end and the second end, said transition portion having a frustoconical transition inside surface.

2. The coupling of claim 1 wherein the transition portion has a length that is no greater than about 40% of the length of the coupling.

3. The coupling of claim 1 which includes:
   (a) a second elastomeric gasket having an inside diameter that is configured to be less than the plastic pipe outside diameter;
   (b) an annular groove on the inside surface of the coupling adjacent to the second end that is adapted to receive the second elastomeric gasket.

4. The coupling of claim 3 wherein the annular groove adjacent the second end of the coupling has a width that is approximately equal to the distance from the second end to the center of said annular groove.

5. The coupling of claim 1 which has a sidewall of varying thickness along its length, wherein the thickest portion of the sidewall is in the transition portion.

6. The coupling of claim 1 wherein:
(a) the second engagement portion has an inside surface that is adapted to form the friction fit with the outside diameter of the plastic pipe;
(b) the frustoconical transition inside surface terminates in a curved surface at the inside surface of the second engagement portion.

7. The coupling of claim 1 wherein:
(a) the second engagement portion has an inside surface that is adapted to form the friction fit with the outside diameter of the plastic pipe;
(b) the frustoconical transition inside surface terminates at the inside surface of the second engagement portion in a ledge surface that is generally perpendicular to the inside surface of the second engagement portion.

8. The coupling of claim 1 which is adapted for use in joining together a ductile iron pipe having a ductile iron pipe inside diameter and a plastic pipe having a plastic pipe inside diameter, said coupling having a coupling length that is configured to be between one and six times the smaller of the inside diameter of the ductile iron pipe and inside diameter of the plastic pipe.

9. The coupling of claim 8 which is adapted for use in joining together a ductile iron pipe having a ductile iron pipe inside diameter and a plastic pipe having a plastic pipe inside diameter, wherein the inside diameter of the ductile iron pipe is configured to be not the same as the inside diameter of the plastic pipe, said coupling further comprising a transition portion which comprises a reducer section that serves to bridge the difference between the inside diameter of the ductile iron pipe and the inside diameter of the plastic pipe.

10. A method for joining together a ductile iron pipe having a ductile iron pipe end and a ductile iron pipe outside diameter and a plastic pipe having a plastic pipe end and a plastic pipe outside diameter, said method comprising:
(a) providing a coupling comprising:
(i) a first end that is adapted to accept the ductile iron pipe;
(ii) a first elastomeric gasket having an inside diameter that is less than the ductile iron pipe outside diameter, said first elastomeric gasket having an outer annular groove;
(iii) an annular groove adjacent to the first end, said annular groove having a central bead so that said annular groove may receive the first elastomeric gasket;
(iv) a first engagement portion having an inside diameter that is sized so as to form a friction fit with the outside diameter of the ductile iron pipe;
(v) a second end that is adapted to accept the plastic pipe;
(vi) a second engagement portion having an inside diameter that is sized so as to form a friction fit with the outside diameter of the plastic pipe;
(vii) a transition portion between the first end and the second end, said transition portion having a frustoconical transition surface;
(b) placing the first elastomeric gasket into the annular groove adjacent the first end of the coupling;
(c) inserting the end of the plastic pipe into the second end of the coupling;
(d) pushing the coupling onto the end of the plastic pipe until the end of the plastic pipe extends at least to the termination of the transition portion of the coupling at the inside surface of the second engagement portion;
(e) inserting the end of the ductile iron pipe into the first end of the coupling;
(f) pushing the end of the ductile iron pipe into the coupling.

11. The method of claim 10 which includes the step of applying a lubricant to the end of the plastic pipe before inserting it into the second end of the coupling.

12. The method of claim 10 which includes:
(a) providing a coupling in which the frustoconical transition inside surface terminates at the inside surface of the second engagement portion in a ledge surface that is generally perpendicular to the inside surface of the second engagement portion, said ledge surface comprising an abutment surface for the end of the plastic pipe;
(b) pushing the end of the plastic pipe into contact with the ledge surface at the termination of the frustoconical transition inside surface of the transition portion of the coupling.

13. The method of claim 10 which includes providing a coupling having a sidewall of varying thickness along its length, wherein the thickest portion of the sidewall is in the transition portion.

14. The method of claim 10 which includes providing a coupling in which:
(a) the second engagement portion has an inside surface that is adapted to form the friction fit with the outside diameter of the plastic pipe;
(b) the frustoconical transition inside surface terminates at the inside surface of the second engagement portion in a curved surface.

15. The method of claim 10 which includes:
(a) providing a second elastomeric gasket having an inside diameter that is less than the plastic pipe outside diameter;
(b) providing an annular groove adjacent to the second end of the coupling that is adapted to receive the second elastomeric gasket;
(c) placing the second elastomeric gasket into the annular groove adjacent the second end of the coupling.

16. The method of claim 15 which includes providing the annular groove adjacent the second end of the coupling with a width that is approximately equal to the distance from the second end to the center of said annular groove.

* * * * *